Patented May 11, 1948

2,441,295

UNITED STATES PATENT OFFICE 2,441,295

MANUFACTURE OF OIL SOLUBLE DIALKYL PHOSPHORIC ACIDS

Herschel G. Smith, Wallingford, and Troy L. Cantrell, Lansdowne, Pa., assignors to Gulf Oil Corporation, Pittsburgh, Pa., a corporation of Pennsylvania No Drawing. Application March 19, 1945, Serial No. 583,656

1 Claim. (Cl. 260—461)

This invention relates to the manufacture of di-alkyl phosphoric acids and it comprises new and improved methods of making such acids, and it also comprises the new oil-soluble acids prepared thereby; all as more fully hereinafter described and claimed.

In particular, this invention relates to a new, oil-soluble unsymmetrical alkyl phosphoric acid; namely, 3-methyl-butyl, 2-ethyl-hexyl ortho phosphoric acid. This acid may be represented by the following formula:

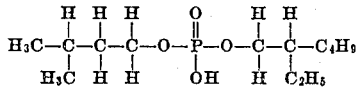

As shown by the above formula, this oil-soluble compound is 3-methyl-butyl, 2-ethyl-hexyl acid phosphate. That is, it is an acid phosphate di-ester of 3-methyl-butanol-1 and 2-ethyl-hexanol-1; it being a mixed ester of such alcohols.

In fact, the above di-alkyl phosphoric acid can be readily prepared from the said alcohols by our improved methods, as described and illustrated post.

In doing so, a mixture of 3-methyl-butanol-1 and 2-ethyl-hexanol-1, containing equimolecular proportions of said alcohols, is reacted with phosphorus pentoxide ($P_2O_5$) in the presence of a hydrocarbon liquid, such as light mineral oils, volatile hydrocarbon solvents, and the like; the reaction temperature being controlled and maintained below 250° F. By maintaining the temperature of the reaction mixture between 40° F. and 230° F., a high yield of the desired di-alkyl phosphoric acid is obtained.

In our improved methods, the hydrocarbon liquid serves as a reaction medium and diluent during the reaction, and facilitates the control thereof; the reaction being an exothermic one. In particular, its presence aids in controlling the reaction temperature and the course of the reaction. Further, the hydrocarbon liquid also serves as a solvent for the di-alkyl phosphoric acid produced; it being soluble in such hydrocarbons.

In the practice of our improved methods, certain embodiments thereof are particularly advantageous in the commercial manufacture of said di-alkyl phosphoric acids. For instance, one such advantageous process is as follows. The phosphorus pentoxide is first wet with and dispersed in the hydrocarbon liquid. Then the equimolecular mixture of said alcohols is gradually added to the dispersion of $P_2O_5$ in the hydrocarbon liquid, with stirring. The reaction is vigorous and exothermic. Accordingly, the alcohol mixture is added at such a gradual rate as to facilitate maintaining the reaction temperature below 160° F.; the mixture being cooled, if necessary, to maintain it below that temperature. In this way, the reaction temperature may be maintained between 60° and 140° F. during the reaction. By so controlling the temperature, side reactions and the formation of by-products is reduced to a minimum. That is, the mixed alcohols are converted into the corresponding mixed di-ester of acid ortho phosphate; they being reacted with the $P_2O_5$ in a molar ratio of 2:2:1. In other words, 2 moles of each of the alcohols are added and reacted for each mol of $P_2O_5$ employed.

In such advantageous methods, we may employ volatile hydrocarbon liquids, such as pentane, hexane, Stoddard solvent, Gulf Naphtha B and like solvent naphthas, boiling below 425° F., as the hydrocarbon diluent or reaction media. Such volatile hydrocarbon liquids are good solvents for the said di-alkyl phosphoric acids. In this way, solutions of the said phosphoric acids in volatile solvents can be directly and readily prepared. Such solvents are useful for various purposes.

Also, the di-alkyl phosphoric acids, per se, can be readily obtained from such solutions by evaporating or distilling off the volatile solvent; the said acids being relatively non-volatile as compared with such solvents.

One such advantageous embodiment of this invention is illustrated in the following example:

*Example I.*—Into a suitable vessel, equipped with a stirrer and a reflux condenser, and means for heating and cooling, there were charged 200 grams of commercial hexane at 60° F.; this commercial hexane having a boiling point between 136° and 156° F. at atmospheric pressure. Then, 142 grams of phosphorus pentoxide ($P_2O_5$) were gradually added to the hexane with stirring. The stirring was continued until the phosphorus pentoxide was wetted by and thoroughly dispersed in the solvent, to form a hexane-phosphorus pentoxide slurry.

In the meantime, 261 grams of 2-ethyl-hexanol-1 and 177 grams of 3-methyl-butanol-1 were mixed together to form an equimolecular admixture thereof.

Then, the above mixture of alcohols was gradually added to the hexane-phosphorus pentoxide slurry while continuing the stirring. The reaction was vigorous and exothermic, and the alcohol mixture was added at such a gradual rate as to maintain the reaction temperature below 100° F.; the mixture being cooled, if necessary, to hold it below that temperature. In this way, the reaction temperature was maintained between 60° and 100° F. during the period of adding the alcohol mixture.

After all the alcohol mixture had been added and the exothermic reaction had subsided, the reaction mixture was gradually heated to and maintained at 160° F. to complete the reaction; about one-half hour at said temperature being sufficient.

The hexane solution of 3-methyl-butyl, 2-ethyl-hexyl phosphoric acid so obtained was then heated to 200° F. under reduced pressure (15 inches of mercury) to distill off the hexane and recover the said di-alkyl phosphoric acid. This acid when cooled to room temperature was a clear, oily liquid having a bright amber color.

The di-alkyl phosphoric acid obtained in the above example was also readily soluble in mineral oils and like hydrocarbons; it being a mixed di-ester. However, it was a relatively strong acid having an acid number of 192.

Indeed, this di-alkyl phosphoric acid can be formed in situ in light mineral oils by the improved method illustrated in Example I ante. That is, a light mineral oil may be employed as the hydrocarbon diluent in lieu of a volatile hydrocarbon solvent. The preparation of solutions of this acid in mineral oils is illustrated in the following example:

*Example II.*—First, a creamy slurry of phosphorus pentoxide in light lubricating oil was prepared by adding 142 pounds of $P_2O_5$ to 568 pounds of a light mineral oil having a viscosity of 100 seconds, SUV at 100° F., with stirring, the stirring being continued until the phosphorus pentoxide was wetted by and thoroughly dispersed in the oil and a creamy slurry obtained.

In the meantime, 177 pounds of 3-methyl-butanol-1 and 261 pounds of 2-ethyl-hexanol-1 were mixed together to form an equimolecular mixture thereof.

Then, the creamy slurry of $P_2O_5$ in oil was gradually added to the above mixture of alcohols with stirring. The reaction was vigorous and exothermic, and the creamy slurry of $P_2O_5$ in oil was added at such a gradual rate as to maintain the reaction temperature below 150° F. during said addition. In this way, the reaction temperature was maintained between 70° and 150° F. during the vigorous reaction. After all the $P_2O_5$ had been so added and the exothermic reaction had subsided, the reaction mixture was gradually heated to and maintained at 230° F. to complete the reaction and dehydrate the oil solution of di-alkyl phosphoric acid so obtained.

The oil solution of 3-methyl-butyl, 2-ethyl-hexyl phosphoric acid so obtained was then cooled to room temperature. This oil solution thereof was a clear, bright, light colored liquid; it having a color of 1.0 NPA.

This solution of the said di-alkyl phosphoric acid in mineral oil is useful for many purposes. For instance, it is particularly useful and advantageous in preparing various improvement agents for mineral oils and like compositions. For example, this di-alkyl phosphoric acid may be converted in various amine addition salts, in situ in the oil, to obtain a wide variety of rust inhibitors, anti-foam agents and other improvement agents for mineral oil compositions; such improvement agents being directly obtained in the form of concentrated solutions in oil.

In general, improved mineral oil compositions can be readily prepared by incorporating small amounts of said amine salts in a wide range of mineral lubricating oils; the said concentrated oil solutions thereof being readily soluble in and miscible with petroleum lubricants.

For example, improved anti-rust lubricants and mineral oil compositions containing amine salts of 3-methyl-butyl, 2-ethyl-hexyl phosphoric acid with primary fatty amines and di-cyclohexyl amine, respectively, are described and claimed in certain prior applications filed by us as follows: Serial No. 420,438, filed November 25, 1941; Serial No. 420,439, filed November 25, 1941; Serial No. 422,008, filed December 6, 1941; and Serial No. 519,810, filed January 26, 1944, which have respectively issued as U. S. Patents 2,371,851; 2,371,852; 2,371,655, and 2,371,656 on March 20, 1945.

As shown in the above applications, such improved mineral oil compositions and petroleum lubricants have marked anti-rust qualities, as well as other advantageous properties.

Further, improved anti-foam mineral oil compositions containing still other amine salts of 3-methyl-butyl, 2-ethyl-hexyl phosphoric acid, as a foam inhibitor, are described in still other prior applications filed by us as follows: Serial No. 453,458, filed August 3, 1942; Serial No. 454,460, filed August 11, 1942; Serial No. 459,179, filed September 21, 1942; Serial No. 459,180, filed September 21, 1942; and Serial No. 479,794, filed March 19, 1943, which have respectively issued as U. S. Patents 2,397,377; 2,397,378; 2,397,379; 2,397,380, and 2,397,381 on March 26, 1946.

As shown in the above applications, such improved anti-foam mineral oils and oil compositions are particularly resistant to foaming when agitated. They also have other advantageous properties due to the presence of said anti-foam agents.

The present application is a continuation-in-part of all of our above-mentioned prior copending applications; it being directed to new and improved methods of making the 3-methyl-butyl, 2-ethyl-hexyl phosphoric acid or acid phosphate di-ester employed in making the various amine salts disclosed in those applications, as rust inhibitors or anti-foam agents, respectively.

In general, this di-alkyl phosphoric acid is useful in making a wide variety of salts thereof. It readily reacts with various inorganic and organic bases to form salts thereof useful for various purposes. Indeed, the said salts thereof can be directly prepared as such, as well as in situ in hydrocarbon liquids, as mentioned ante.

Likewise, our improved methods are also useful in making other di-alkyl phosphoric acids, both symmetrical and unsymmetrical di-esters of ortho phosphoric acids. However, our improved methods are particularly useful and advantageous in making mixed esters or unsymmetrical di-alkyl phosphoric acids. For instance, as shown ante, unsymmetrical di-alkyl phosphoric acids can be readily obtained, in high yield, by our improved methods wherein phosphorus pentoxide is simultaneously reacted with a mixture of two alcohols containing the same in equimolecular proportions, under controlled conditions as described and illustrated ante.

In other words, we may employ mixtures of various other alcohols in our improved method, in lieu of the 3-methyl-butanol-1 and 2-ethyl-hexanol-1 shown in Examples I and II ante. For instance, mixtures of other alcohols, both straight chain alcohols as well as branched chain alkyl alcohols, may be employed.

In general, our improved methods are useful and advantageous in making di-alkyl phosphoric acids having the following generic formula:

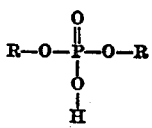

wherein R represents an alkyl group, either a straight chain or branched chain alkyl group. However, our improved process was particularly useful and advantageous in making unsymmetrical phosphoric acids having the formula:

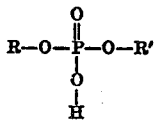

wherein R and R' represent different alkyl groups, respectively.

What we claim is:

The process of preparing 3-methyl-butyl, 2-ethyl-hexyl phosphoric acid which comprises dispersing phosphorus pentoxide in a light mineral oil to form a creamy slurry, mixing equimolecular amounts of 3-methyl-butanol-1 and 2-ethyl-hexanol-1, and gradually mixing the slurry of phosphorus pentoxide and the mixture of 3-methyl-butanol-1 and 2-ethyl-hexanol-1 while maintaining the reaction temperature between 40° and 230° F., the molar ratio of 3-methyl-butanol-1, 2-ethyl-hexanol-1 and phosphorus pentoxide being 2:2:1.

HERSCHEL G. SMITH.
TROY L. CANTRELL.

REFERENCES CITED

The following references are of record in the file of this patent:

UNITED STATES PATENTS

| Number | Name | Date |
| --- | --- | --- |
| 1,993,552 | Izard | Mar. 5, 1935 |
| 2,005,619 | Graves | June 18, 1935 |
| 2,026,785 | Harris | Jan. 7, 1936 |
| 2,080,299 | Benning | May 11, 1937 |
| 2,091,241 | Kvalnes | Aug. 24, 1937 |
| 2,121,611 | Salzberg | June 21, 1938 |
| 2,128,946 | Katzman | Sept. 6, 1938 |
| 2,193,965 | Hochwalt | Mar. 19, 1940 |
| 2,272,668 | Honel | Feb. 10, 1942 |
| 2,274,447 | Hodgins | Feb. 24, 1942 |
| 2,325,597 | Farrington | Aug. 3, 1943 |
| 2,340,331 | Knutson | Feb. 1, 1944 |

FOREIGN PATENTS

| Number | Country | Date |
| --- | --- | --- |
| 470,328 | Great Britain | Aug. 9, 1937 |